US010843172B2

(12) United States Patent
Park et al.

(10) Patent No.: US 10,843,172 B2
(45) Date of Patent: Nov. 24, 2020

(54) CATALYST FOR ELECTROCHEMICAL AMMONIA SYNTHESIS AND METHOD FOR PRODUCING THE SAME

(71) Applicant: KOREA INSTITUTE OF SCIENCE AND TECHNOLOGY, Seoul (KR)

(72) Inventors: Hyun Seo Park, Seoul (KR); Kahyun Hur, Seoul (KR); Min-Soek Kim, Seoul (KR); Jimin Kong, Seoul (KR); Jong Hyun Jang, Seoul (KR); Chang Won Yoon, Seoul (KR); Hyung Chui Ham, Seoul (KR); Suk Woo Nam, Seoul (KR); Jonghee Han, Seoul (KR); Ara Jo, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 44 days.

(21) Appl. No.: 16/216,287

(22) Filed: Dec. 11, 2018

(65) Prior Publication Data

US 2020/0086302 A1    Mar. 19, 2020

(30) Foreign Application Priority Data

Sep. 17, 2018    (KR) .................. 10-2018-0110994

(51) Int. Cl.
*B01J 23/745* (2006.01)
*C01C 1/04* (2006.01)
(Continued)

(52) U.S. Cl.
CPC .......... *B01J 23/745* (2013.01); *B01J 21/185* (2013.01); *B01J 23/72* (2013.01); *B01J 27/02* (2013.01);
(Continued)

(58) Field of Classification Search
CPC ........ B01J 23/745; B01J 21/185; B01J 23/72; B01J 27/02; B01J 2523/17; B01J 2523/62;
(Continued)

(56) References Cited

U.S. PATENT DOCUMENTS 1,408,754 A * 3/1922 McElroy ................. C01C 3/002
                                                    423/352
3,584,998 A * 6/1971 Green ..................... C01B 3/025
                                                    423/352
(Continued)

FOREIGN PATENT DOCUMENTS

CN    10-6694007    *  5/2017    ............. B01J 23/00
JP    2016-519215 A     6/2016
(Continued)

OTHER PUBLICATIONS

Julia da Silveira Salla et al., "Synthesis of citrate-modified CuFeS2 catalyst with significant effect o the photo-Fenton degradation efficiency of bisphenol under a visible light and near-neutral pH." Colloids and Surfaces A 595, pp. 1-9. (Year: 2020).*
(Continued)

*Primary Examiner* — Patricia L. Hailey
(74) *Attorney, Agent, or Firm* — Rabin & Berdo, P.C.

(57) ABSTRACT

ABSTRACT OF THE DISCLOSURE A catalyst for electrochemical ammonia synthesis incudes a carbon carrier composed of carbon; and 20-65 wt% of iron, copper and sulfur, based on weight of the carbon, supported in the carbon carrier. The catalyst may be coated on an electrode selected from the group consisting of carbon paper, carbon cloth, carbon felt, fluorine- doped tin oxide (FTO) conducting glass, and combinations thereof by spray coating, screen printing or ink jet printing. The catalyst has an ammonia synthesis activity up to several times to several tens of times of the activity of the existing single metal or metal oxide
(Continued)

catalysts. Thus, when using the catalyst, it is possible to provide a method for electrochemical ammonia synthesis having an improved ammonia production yield and rate.

14 Claims, 23 Drawing Sheets

(51) Int. Cl.
  *C25B 1/00* (2006.01)
  *C25B 11/12* (2006.01)
  *B01J 23/72* (2006.01)
  *B01J 21/18* (2006.01)
  *B01J 27/02* (2006.01)

(52) U.S. Cl.
  CPC .............. *C01C 1/0411* (2013.01); *C25B 1/00* (2013.01); *C25B 11/12* (2013.01); *B01J 2523/17* (2013.01); *B01J 2523/62* (2013.01); *B01J 2523/842* (2013.01)

(58) Field of Classification Search
  CPC .... B01J 2523/842; C01C 1/0411; C25B 1/00; C25B 11/12
  USPC ............... 502/182, 185, 216, 218, 222, 331; 429/527; 423/362
  See application file for complete search history.

(56) References Cited

U.S. PATENT DOCUMENTS

| 4,363,707 | A | * | 12/1982 | Prigent | .................. | H01M 4/98 205/632 |
| 6,471,932 | B1 | * | 10/2002 | Gieshoff | .............. | C01C 1/0494 123/DIG. 10 |
| 8,741,243 | B2 | * | 6/2014 | Gadkaree | ................. | B01J 20/02 423/215.5 |
| 2003/0215696 | A1 | * | 11/2003 | Chuang | .................. | H01M 4/90 429/480 |
| 2007/0092426 | A1 | * | 4/2007 | Driscoll | ............. | F02M 63/0064 423/352 |
| 2008/0090128 | A1 | * | 4/2008 | Saito | ........................ | B01J 23/58 502/300 |
| 2011/0120915 | A1 | * | 5/2011 | Kuperman | ............. | C10G 1/086 208/403 |

FOREIGN PATENT DOCUMENTS

| JP | 2016-194094 A | | 11/2016 | | |
| KR | 2004-0021074 | * | 3/2004 | ............. | B01J 27/04 |
| KR | 10-2016-0064509 A | | 6/2016 | | |
| KR | 10-2017-0061665 A | | 6/2017 | | |

OTHER PUBLICATIONS

Anna Roffey et al., "Synthesis of ternary sulfide nanomaterials using dithiocarbamate complexes as single source precursors." Nanoscale Advances 1, pp. 3056-3066. (Year: 2019).*
E. Sathiyaraj et al., "Structural, morphological and optical properties of iron sulfide, cobalt sulfide, copper sulfide, zinc sulfide, and copper-iron sulfide nanoparticles synthesized from single source precursors." Chemical Physics Letters 739, pp. 1-9. (Year: 2020).*
Yu-Hsiang A. Wang et al., "Shape-controlled synthesis of semiconducting CuFeS2 nanocrystals." Solid State Sciences 12, pp. 387-390. (Year: 2010).*
C. Zamfirescu, I. Dincer, "Using ammonia as a substainable fuel", Journal of Power Sources, 2008, pp. 459-465, vol. 185.
George Marnellos et al., "Ammonia Synthesis at Atmospheric Pressure", Science, Oct. 2, 1998, pp. 98-100, vol. 282.
Rong Lan et al., "Synthesis of ammonia directly from air and water at ambient temperature and pressure", Science Reports, Jan. 29, 2013, pp. 1-7, vol. 3, No. 1145.

* cited by examiner

CATALYST FOR ELECTROCHEMICAL AMMONIA SYNTHESIS AND METHOD FOR PRODUCING THE SAME

CROSS-REFERENCE TO RELATED APPLICATIONS

This application claims, under 35 U.S.C. § 119, the priority of Korean Patent Application No. 10-2018-0110994 filed on Sep. 17, 2018 in the Korean Intellectual Property Office, the disclosure of which is incorporated herein by reference in its entirety.

TECHNICAL FIELD

The following disclosure relates to a catalyst for electrochemical ammonia synthesis and a method for producing the same.

BACKGROUND

To prepare regulation on green gas emission and exhaust of fossil fuel caused by a climate change, some studies about application of ammonia (17.6 wt % $H_2$) that is a hydrogen-storing body to fuel cells, fuel for vehicles, or the like, as a substitute for fuel. Ammonia, a carbon-free energy carrier, is liquefied at 21° C. under 7.86 bar and thus is convenient to store and transport as compared to hydrogen, and emits water and nitrogen only as shown in the following Reaction Scheme 1 upon the complete combustion. In addition, ammonia has a high energy density per volume (HHV $NH_3$: 13.6 $GJ/m^3$) similar to that of fossil fuel (HHV LPG: 19 $GJ/m^3$, HHV CNG: 10.4 $GJ/m^3$) (Non-Patent Document 1).

$$4NH_3(g)+3O_2(g) \rightarrow 2N_2(g)+6H_2O(g), \Delta H=-1266 \text{ kJ/mol} \quad \text{[Reaction Scheme 1]}$$

The most general method for producing ammonia is the Haber-Bosch process using hydrogen and nitrogen as starting materials and carried out under a higher pressure (150-250 bar) at a high temperature (400-500° C.) in the presence of an iron or ruthenium catalyst as shown in the following Reaction Scheme 2. The reaction consumes a significantly large amount of energy of about 34.4 GJ/ton $NH_3$ and causes a problem in that it emits a large amount of greenhouse gas corresponding to 1.8 ton $CO_2$/ton $NH_3$ due to the fossil fuel used for supplying the energy.

$$N_2+3H_2 \rightarrow 2NH_3+92.2 \text{ kJ} \quad \text{[Reaction Scheme 2]}$$

To overcome the above-mentioned problem of the Haber-Bosch process, a method for electrochemical ammonia synthesis using an ion conductive oxide electrolyte has been suggested. Active studies have been conducted about a method for electrochemical ammonia synthesis from water and nitrogen using an electrolyte (Non-Patent Document 2). Among the methods for electrochemical ammonia synthesis, a method using a polymer ion exchange membrane or a method for synthesizing ammonia in an aqueous solution at room temperature allows ammonia synthesis at lower temperature under lower pressure, as compared to a method using molten salt, and has an effect of increasing the conversion in the exothermic ammonia synthesis reaction. Thus, such methods have been studied actively. An electrochemical cell for ammonia synthesis undergoes a series of steps as shown in the following Reaction Scheme 3, and includes anode reaction (3-1) in which hydroxide ions are oxidized at the anode to generate oxygen gas and cathode reaction (3-2) in which water and nitrogen are reduced to produce water and ammonia. The final products of the method for electrochemical ammonia synthesis merely include ammonia and oxygen, and thus the method avoids carbon emission advantageously.

[Reaction Scheme 3]

$$\text{Anode reaction: } 12OH^- \rightarrow 3O_2+6H_2O+12e^- \quad (3\text{-}1)$$

$$\text{Cathode reaction: } 12H_2O+2N_2+12e^- \rightarrow 4NH_3+12OH^- \quad (3\text{-}2)$$

The main limiting reaction in the electrochemical ammonia synthesis reactions is the step of reducing nitrogen molecules into ammonia, which is the reaction at the cathode. This results from the strong triple bond of a nitrogen molecule. When using an aqueous electrolyte, a hydrogen-generating reaction occurs frequently instead of nitrogen reduction as a cathode reaction. In fact, it is known that the current efficiency is less than 1% when using a water electrolysis-based system (Non-Patent Document 3). For this, it is essential to coat an electroconductive electrode functioning as a cathode with a nitrogen reduction-selective catalyst in order to increase yield of ammonia.

REFERENCES

Non-Patent Documents

Non-Patent Document 1. Zamfirescu, C., and I. Dincer. Journal of Power Sources 185.1 (2008): 459-465
Non-Patent Document 2. Marnellos, George, and Michael Stoukides. Science 282.5386 (1998): 98-100
Non-Patent Document 3. Lan, Rong, John TS Irvine, and Shanwen Tao. Scientific Reports 3 (2013): 1145

SUMMARY

The present disclosure is designed to solve the problems of the related art, and an embodiment of the present disclosure is directed to providing a catalyst for ammonia synthesis.

The present disclosure is also directed to providing a method for producing a catalyst for ammonia synthesis.

In one aspect, there is provided a catalyst for electrochemical ammonia synthesis, including iron, copper and sulfur.

According to an embodiment of the present disclosure, the elemental content of iron may be 0.1-10% based on the total elemental content of iron, copper and sulfur.

According to another embodiment of the present disclosure, the elemental content ratio of copper to sulfur may be 1:2-2:1.

According to still another embodiment of the present disclosure, the catalyst may be supported in a carbon carrier in an amount of 20-65 wt % based on the weight of carbon.

According to still another embodiment of the present disclosure, the carbon carrier may be at least one carbon material selected from KETJETBLACK manufactured by AKZO NOBEL, carbon black, graphite, carbon nanotubes, carbon nanocages and carbon fibers.

According to still another embodiment of the present disclosure, the catalyst may be coated on at least one electrode selected from carbon paper, carbon cloth, carbon felt and fluorine-doped tin oxide (FTO) conducting glass.

According to still another embodiment of the present disclosure, the coating may be carried out through any one method selected from spray coating, screen printing and ink jet printing.

According to yet another embodiment of the present disclosure, the coating may be carried out at an areal density of 0.1-10 mg/cm$^2$.

In another aspect, there is provided a method for producing a catalyst for ammonia synthesis, including the steps of: mixing a sulfur precursor, copper precursor, iron precursor and carbon with an organic solvent to provide a mixture; filtering the mixture under vacuum to obtain a filtrate; and heat treating the filtrate.

In still another aspect, there is provided an electrode for ammonia synthesis, including the catalyst.

The catalyst according to the present disclosure has an ammonia synthesis activity up to several times to several tens of times of the activity of the existing single metal or metal oxide catalysts. Thus, when using the catalyst according to the present disclosure, it is possible to provide a method for electrochemical ammonia synthesis having an improved ammonia production yield and rate.

DETAILED DESCRIPTION OF EMBODIMENTS

Figure 1:
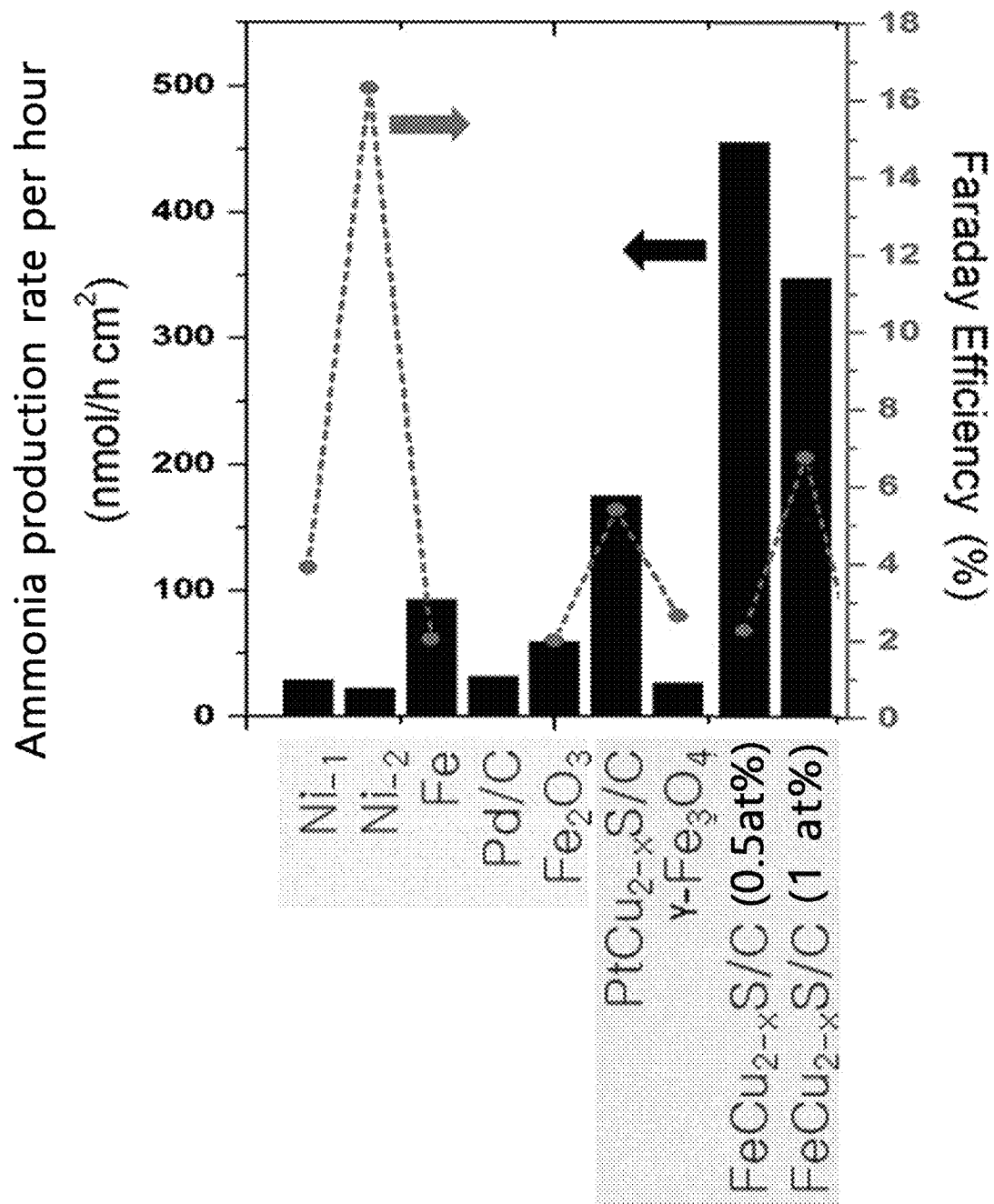
FIG. 1 is a graph illustrating the ammonia production rate and Faraday efficiency of each of the used catalysts as a function of time.

Hereinafter, various aspects and embodiments of the present disclosure will be explained in more detail.

Exemplary embodiments now will be described more fully hereinafter with reference to the accompanying drawings, in which exemplary embodiments are shown.

The present disclosure may, however, be embodied in many different forms and should not be construed as limited to the exemplary embodiments set forth therein. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In one aspect, there is provided a catalyst for ammonia synthesis, including iron, copper and sulfur.

As describe above, a method for electrochemical ammonia synthesis has a problem of low production efficiency at low temperature under lower pressure in the absence of an efficient catalyst. The catalyst according to the present disclosure is used for low temperature/low pressure electrochemical ammonia synthesis. When using the catalyst according to the present disclosure for electrochemical ammonia synthesis, the reaction of hydrogen production, which is a competitive reaction of the reaction of ammonia production, is inhibited significantly on the catalyst surface. Thus, it is possible to increase the conversion efficiency in ammonia synthesis. In addition, the voltage required for production of ammonia, including nitrogen reduction and water oxidation, is significantly low, thereby significantly increasing energy efficiency required for producing ammonia. Particularly, it is observed that the catalyst according to the present disclosure has ammonia synthesis activity up to several times to several tens of times of the activity of single metal (Ni, Fe, Pd, Ru) or metal oxide ($Fe_2O_3$) used conventionally for electrochemical ammonia synthesis. Thus, it is possible to increase ammonia synthesis efficiency significantly.

According to an embodiment, the elemental content of iron may be 0.1-10%, preferably 0.5-1%, based on the total elemental content of iron, copper and sulfur. When iron is present in an amount less than the above-defined range, ammonia synthesis activity is reduced rapidly. When iron is present in an amount larger than the above-defined range, the catalyst is degraded in terms of durability to cause a collapse of the catalyst. In addition, when the elemental content of iron is 0.5-1 at %, it is possible to maximize the ammonia synthesis activity.

According to another embodiment, the elemental content ratio of copper to sulfur may be 1:2-2:1.

According to still another embodiment, the catalyst may be supported on a carbon carrier in an amount of 20-65% based on the weight of carbon.

According to still another embodiment, the carbon carrier may be at least one selected from KENJENBLACK, carbon black, graphite, carbon nanotubes, carbon nanocages and carbon fibers.

The carbon carrier is not limited to the above-listed carriers and any carbon particles having a large specific surface area may be used as a carrier. When using carbon as a catalytic carrier, the ammonia production rate is increased to about 2 times of the ammonia production rate of the catalyst using no carbon. Thus, it is effective to use carbon as a catalytic carrier.

According to still another embodiment, the catalyst may be coated on at least one electrode selected from carbon paper, carbon cloth, carbon felt and fluorine-doped tin oxide (FTO) conducting glass.

According to still another embodiment, the coating may be carried out through any one method selected from spray coating, screen printing and ink jet printing, but is not limited thereto. Preferably, a spray coating method may be used.

According to yet another embodiment of the present disclosure, the coating may be carried out at an areal density of 0.1-10 $mg/cm^2$.

In another aspect, there is provided a method for producing a catalyst for ammonia synthesis, including the steps of: mixing a sulfur precursor, copper precursor, iron precursor and carbon with an organic solvent to provide a mixture; filtering the mixture under vacuum to obtain a filtrate; and heat treating the filtrate.

Particularly, although there is no clear description in the following Examples and Comparative Examples, various types of sulfur precursors, copper precursors, iron precursors and organic solvents were used to obtain catalysts, and then electrodes coated with the catalysts were used to determine the ammonia production yields and to observe the shapes of the catalysts through a transmission electron microscope.

As a result, it can be seen that when the following conditions are totally satisfied, significantly high ammonia synthesis efficiency can be obtained and the resultant catalyst has a preferred wire shape, unlike the conditions including the other types of sulfur precursors, copper precursors, iron precursors and organic solvents:

(i) the sulfur precursor is thiourea,
(ii) the copper precursor is cuprous chloride ($CuCl_2$),
(iii) the iron precursor is ferric chloride ($FeCl_3$),
(iv) carbon is KETJENBLACK, and
(v) the organic solvent is ethanol.

However, when any one of the above conditions is not satisfied, the coated catalyst shows low operation stability, the catalytic crystallinity is disintegrated, and the catalyst has a spherical shape, not a wire shape.

Hereinafter, the present disclosure will be described in detail with reference to the following specific examples. However, the following examples are given only as examples of the present disclosure and it will be obvious to those of ordinary skill in the art that the scope of the present disclosure is not limited or narrowed by the following examples. In addition, it is apparent that the present disclosure can be practiced with ease by those skilled in the art based on the disclosure of the present disclosure, including the following examples, although there is no description of particular experimental results. Also, it will be obvious that such changes and modifications belong to the scope of the appended claims.

Example 1: Manufacture of Electrode Coated with Fe—Cu—S/C (Fe 0.5 at %) Catalyst First, 0.5 g of thiourea 99%, Sigma-Aldrich), 0.5 g of $CuCl_2$ (99%, Sigma-Aldrich) and 0.9 g of carbon (KENJETBLACK) were added to ethanol and mixed therein while carrying out agitation using a magnetic bar for 5 minutes. Next, 100 mL of ethanol containing 0.13 g of $FeCl_3$ dissolved therein was added gradually thereto. The resultant mixture was agitated at room temperature (25° C.) for 2 hours. After the completion of agitation, filtering was carried out by using a vacuum pump while adding 100-200 mL of ethanol. After the completion of filtering, the resultant product was introduced to a vacuum oven and dried at room temperature (25° C.) for 12 hours. The dried sample was warmed at a rate of 5° C./min to carry out heat treatment under Ar at 200° C. for 2 hours, thereby providing catalyst powder.

Then, the catalyst powder was sprayed onto a fluorine-doped tin oxide (FTO) conducting glass having a size of 2.5 cm×2.5 cm to form a catalyst layer, and warmed at a rate of 1° C./min under Ar gas to carry out heat treatment at 350° C. for 5 minutes. The heat treated catalyst-coated electrode was used as a working electrode, Ag/AgCl electrode was used as a reference electrode and a carbon bar was used as a counter electrode.

Example 2: Manufacture of Electrode Coated with Fe—Cu—S/C (Fe 1 at %) Catalyst An electrode including a Fe—Cu—S/C catalyst was obtained in the same manner as described in Example 1, except that 0.26 g of $FeCl_3$ was used.

Comparative Example 1: Manufacture of Electrode Coated with Cu—S/C Catalyst

An electrode including a Cu—S/C catalyst was obtained in the same manner as described in Example 1, except that $FeCl_3$ was not added.

Comparative Example 2: Manufacture of Electrode Coated with Fe—Cu—S Catalyst An electrode including a Fe—Cu—S catalyst was obtained in the same manner as described in Example 1, except that carbon particles were not added.

Comparative Example 3: Manufacture of Electrode Coated with Pd—Cu—S/C Catalyst An electrode including a Pd—Cu—S/C catalyst was obtained in the same manner as described in Example 1, except that $PdCl_2$ was used instead of $FeCl_3$.

Comparative Example 4: Manufacture of Electrode Coated with Ru—Cu—S/C Catalyst An electrode including a Ru—Cu—S/C catalyst was obtained in the same manner as described in Example 1, except that $RuCl_3$ was used instead of $FeCl_3$.

Comparative Example 5: Manufacture of Electrode Coated with Pt—Cu—S/C Catalyst An electrode including a Pt—Cu—S/C catalyst was obtained in the same manner as described in Example 1, except that $PtCl_2$ was used instead of $FeCl_3$.

Figure 2A:
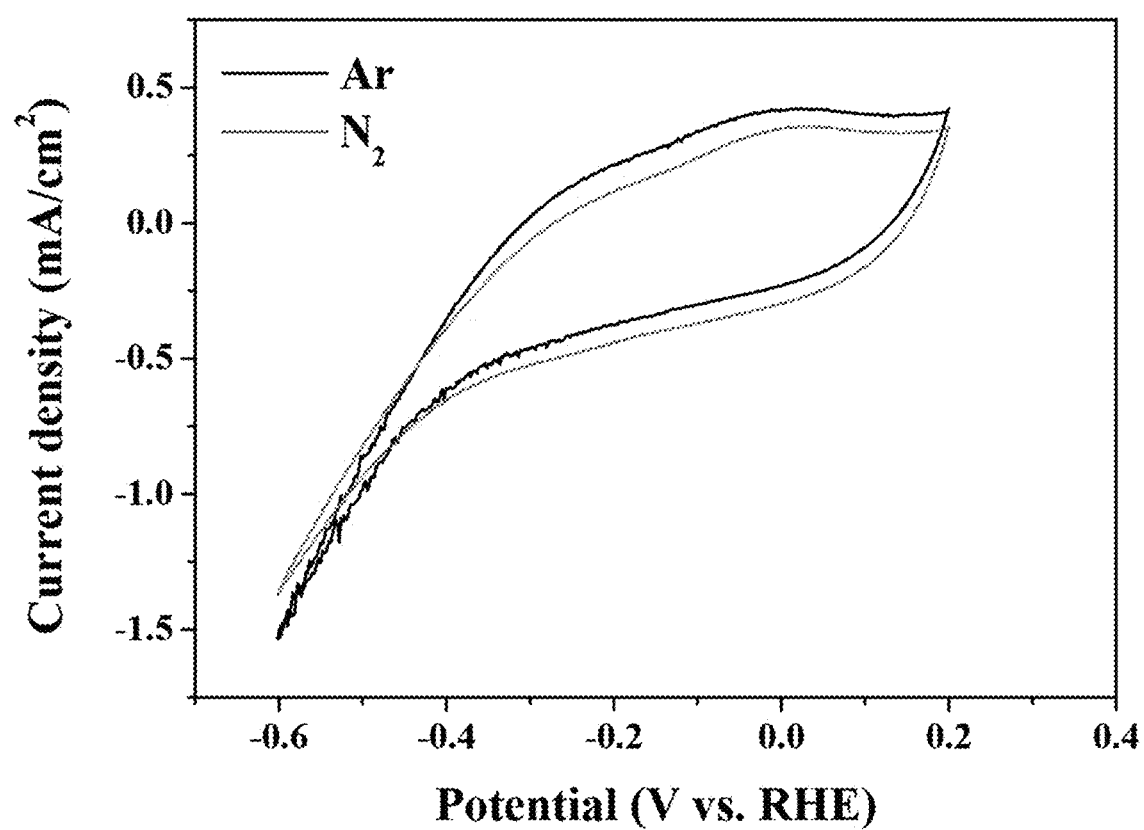
FIG. 2A is a graph of cyclic voltammetry (CV) of the electrode coated with the electrochemical catalyst according to Example 1.
Figure 2B:
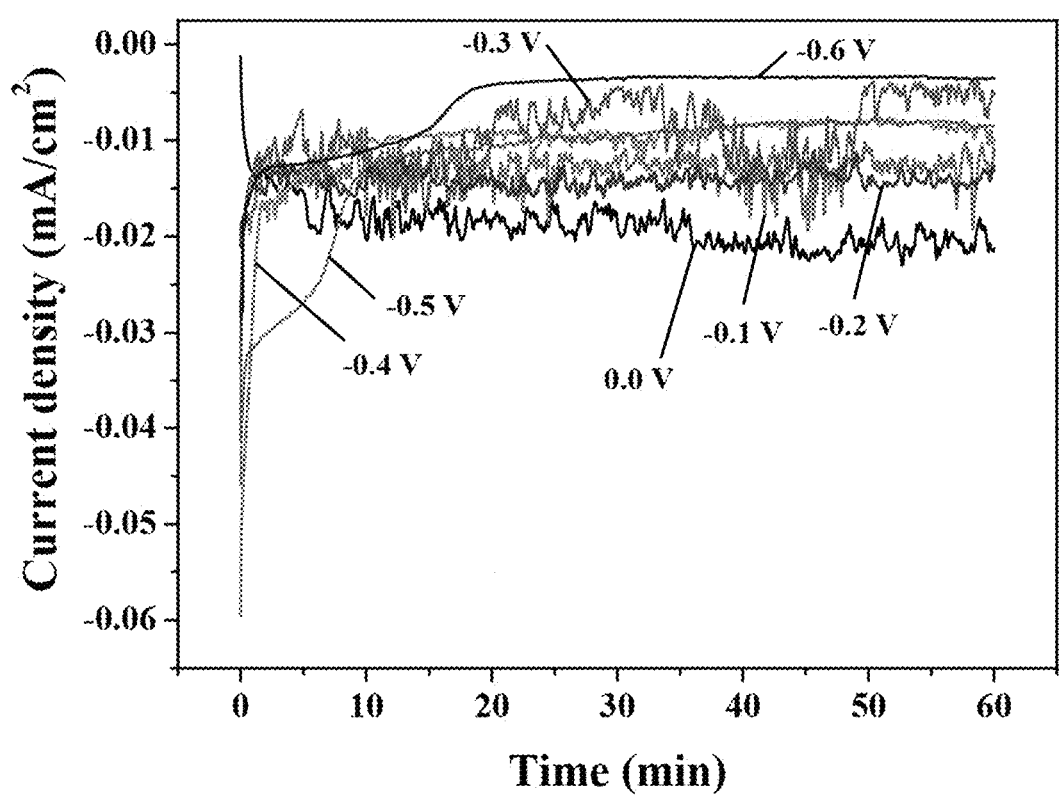
FIG. 2B is a graph of chronoamperometry (CA) of the electrode coated with the electrochemical catalyst according to Example 1.
Figure 2C:
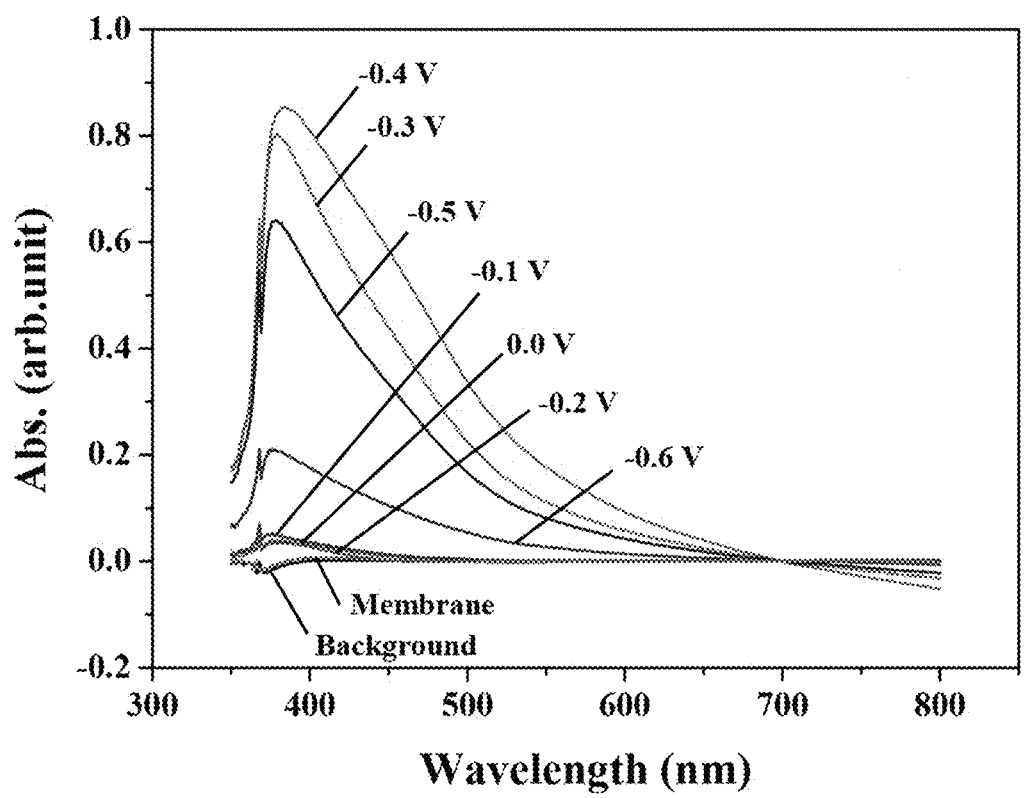
FIG. 2C is a graph of ultraviolet-visible spectrophotometry of ammonia produced at the electrode coated with the electrochemical catalyst according to Example 1 as analyzed by the Nessler's method.
Figure 2D:
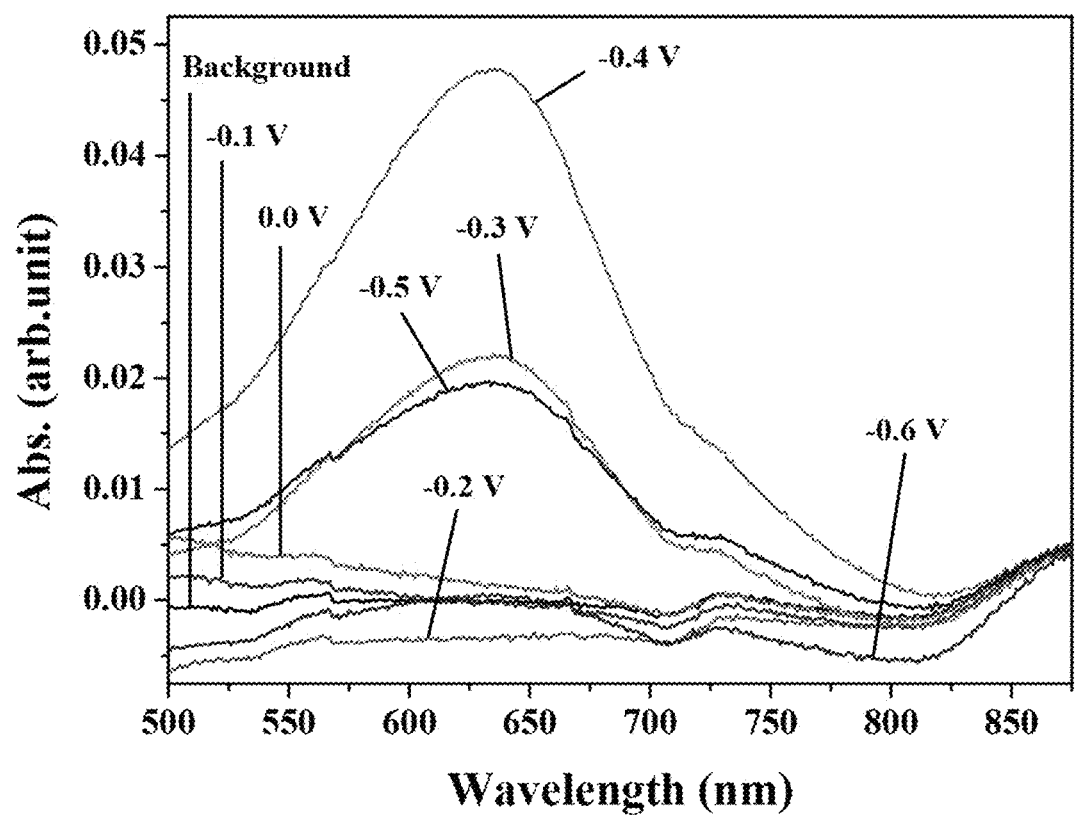
FIG. 2D is a graph of ultraviolet-visible spectrophotometry of ammonia produced at the electrode coated with the electrochemical catalyst according to Example 1 as analyzed by the indophenol method.

Test Example 1: Ammonia Synthesis Data Using Electrode Coated with Fe—Cu—S/C (Fe 0.5 at %) Catalyst The electrode coated with the catalyst according to Example 1 was used to test electrochemical characteristics through cyclic voltammetry and chronoamperometry. In addition, the electrode coated with the catalyst according to Example 1 was used to carry out ammonia synthesis and UV-Vis spectrometry was carried out through the Nessler's method and indophenol method to determine ammonia production. The results of cyclic voltammetry are shown in FIG. 2A, the results of chronoamperometry are shown in FIG. 2B and the results of UV-Vis spectrometry using the Nessler's method and indophenol method are shown in FIG. 2C and FIG. 2D, respectively.

The following Table 1 shows the results of electrochemical ammonia synthesis activity using the electrode coated with the catalyst according to Example 1, as determined by the indophenol method.

TABLE 1

| Applied potential (V vs. RHE) | F.E (%) | $rNH_3$ (nmolh$^{-1}$cm$^{-2}_{geo}$) | current density (μA/cm$^2$) |
|---|---|---|---|
| 0.0 | 0.04 | 13.53 | 1.09 |
| −0.3 | 1.11 | 207.80 | 16.71 |
| −0.4 | 2.28 | 455.06 | 36.59 |
| −0.5 | 0.79 | 188.26 | 15.14 |
| −0.6 | 0.03 | 3.55 | 0.29 |

It can be seen that the highest ammonia synthesis activity is obtained at an applied potential of −0.4V, wherein the ammonia production rate per hour is 455.06 nmolh$^{-1}$cm$^{-2}$. This corresponds to several tens of times of the ammonia production rate of the conventional single metal (Ni, Fe, Pd, Ru) and several times of that of metal oxide ($Fe_2O_3$). FIG. 1 is a graph illustrating the ammonia production rates per hour and Faraday efficiencies of different catalysts.

Figure 3A:
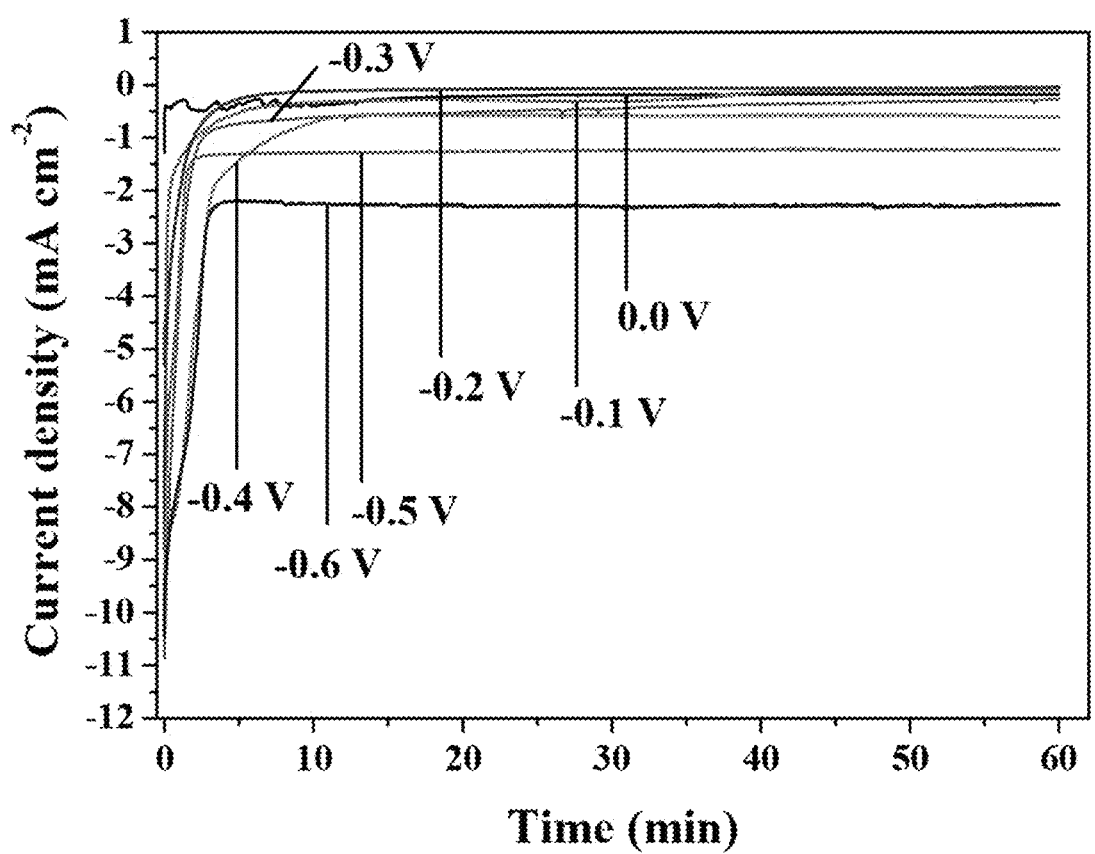
FIG. 3A is a graph of chronoamperometry (CA) of the electrode coated with the electrochemical catalyst according to Example 2.
Figure 3B:
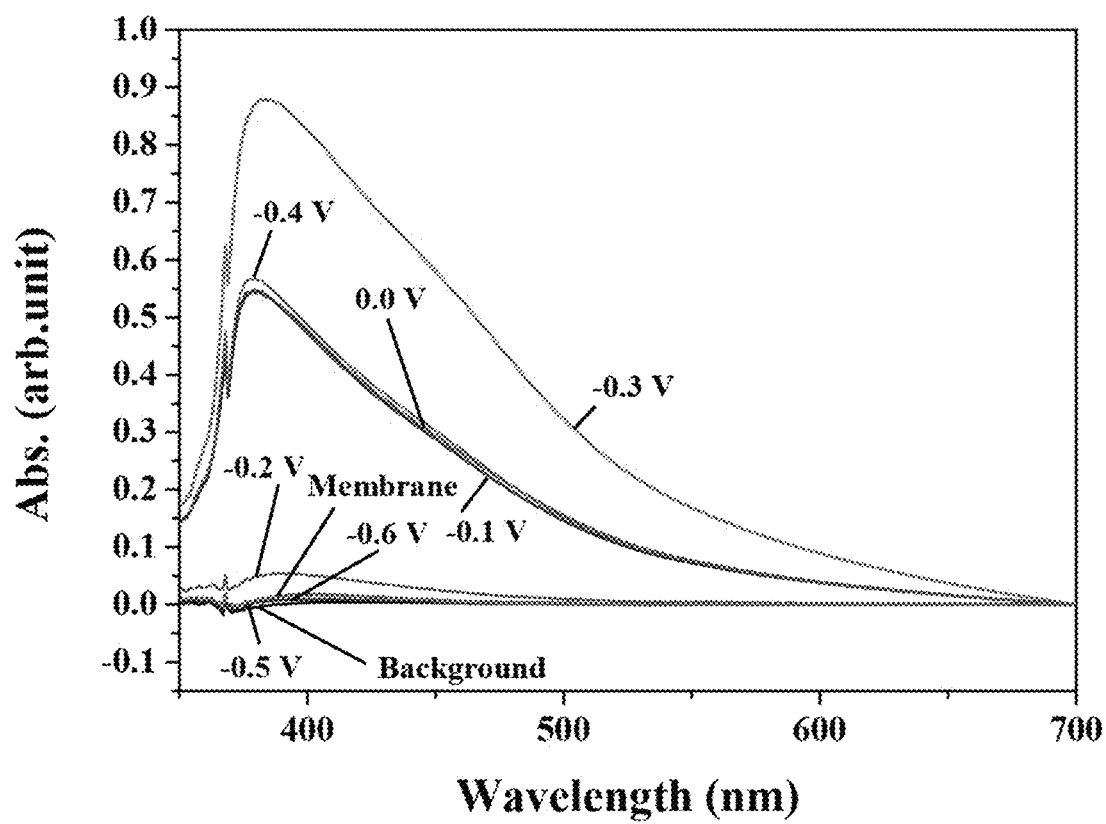
FIG. 3B is a graph of ultraviolet-visible spectrophotometry of ammonia produced at the electrode coated with the electrochemical catalyst according to Example 2 as analyzed by the Nessler's method.
Figure 3C:
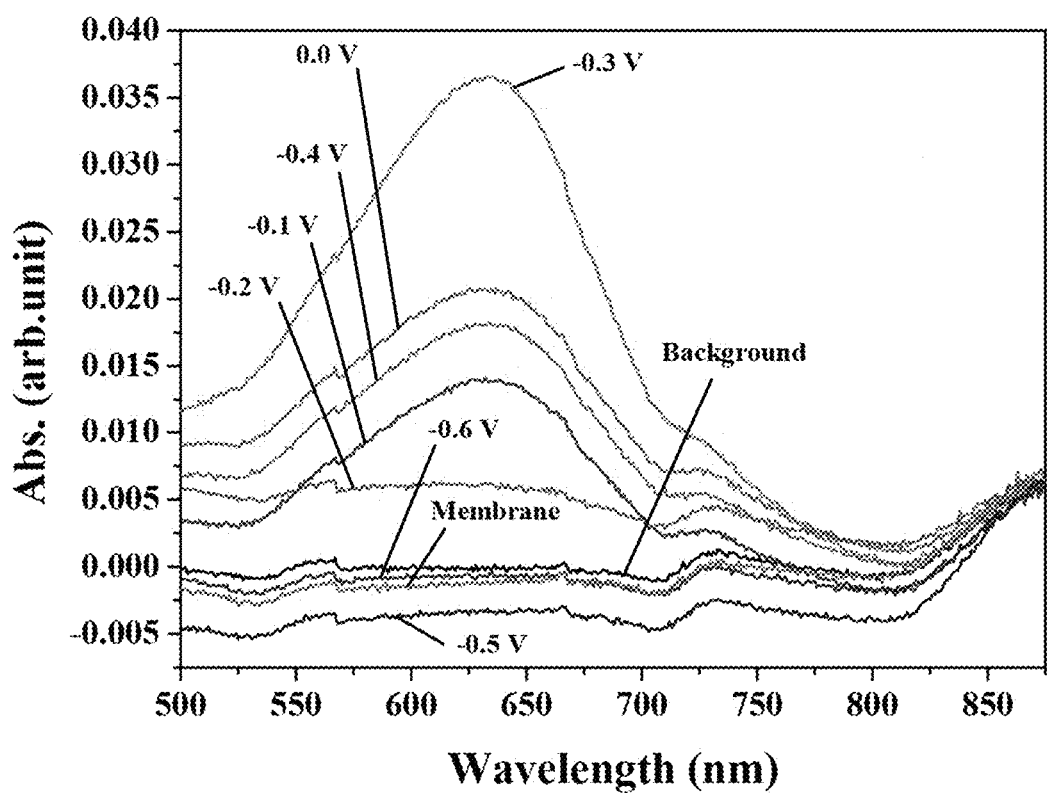
FIG. 3C is a graph of ultraviolet-visible spectrophotometry of ammonia produced at the electrode coated with the electrochemical catalyst according to Example 2 as analyzed by the indophenol method.

Test Example 2: Ammonia Synthesis Data Using Electrode Coated with Fe—Cu—S/C (Fe 1 at %) Catalyst The electrode coated with the catalyst according to Example 2 was used to test electrochemical characteristics through chronoamperometry. In addition, the electrode coated with the catalyst according to Example 2 was used to carry out ammonia synthesis and UV-Vis spectrometry was carried out through the Nessler's method and indophenol method to determine ammonia production. The results of chronoamperometry are shown in FIG. 3A and the results of UV-Vis spectrometry using the Nessler's method and indophenol method are shown in FIG. 3B and FIG. 3C, respectively.

The following Table 2 shows the results of electrochemical ammonia synthesis activity using the electrode coated with the catalyst according to Example 2, as determined by the indophenol method.

TABLE 2

| Applied potential (V vs. RHE) | F.E (%) | $rNH_3$ (nmolh$^{-1}$cm$^{-2}_{geo}$) | current density (μA/cm$^2$) |
|---|---|---|---|
| 0.0 | 6.74 | 196 | 15.77 |
| −0.1 | 3.55 | 133 | 10.68 |
| −0.2 | 2.72 | 60 | 4.81 |
| −0.3 | 4.65 | 348 | 27.98 |
| −0.4 | 1.50 | 173 | 13.90 |

It can be seen that the highest ammonia synthesis activity is obtained at an applied potential of −0.3V, wherein the ammonia production rate per hour is 348 nmolh$^{-1}$cm$^{-2}$. The ammonia production rate is lower as compared to the catalyst containing Fe in an elemental content of 0.5 at %. Thus, this suggests that the highest ammonia synthesis activity is obtained when the elemental content of Fe is 0.5 at %.

Test Example 3: Ammonia Synthesis Data Using Fe-Free Catalyst

Figure 5A:
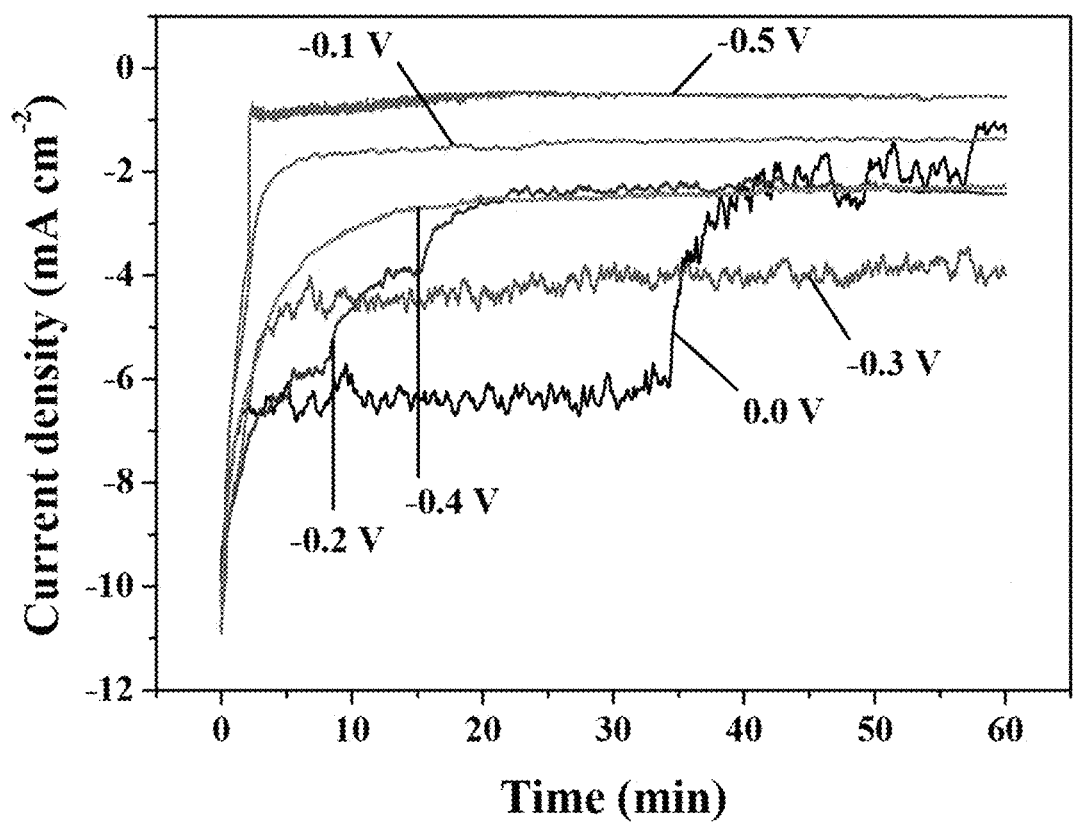
FIG. 5A is a graph of chronoamperometry (CA) of the electrode coated with the electrochemical catalyst according to Comparative Example 1.
Figure 5B:
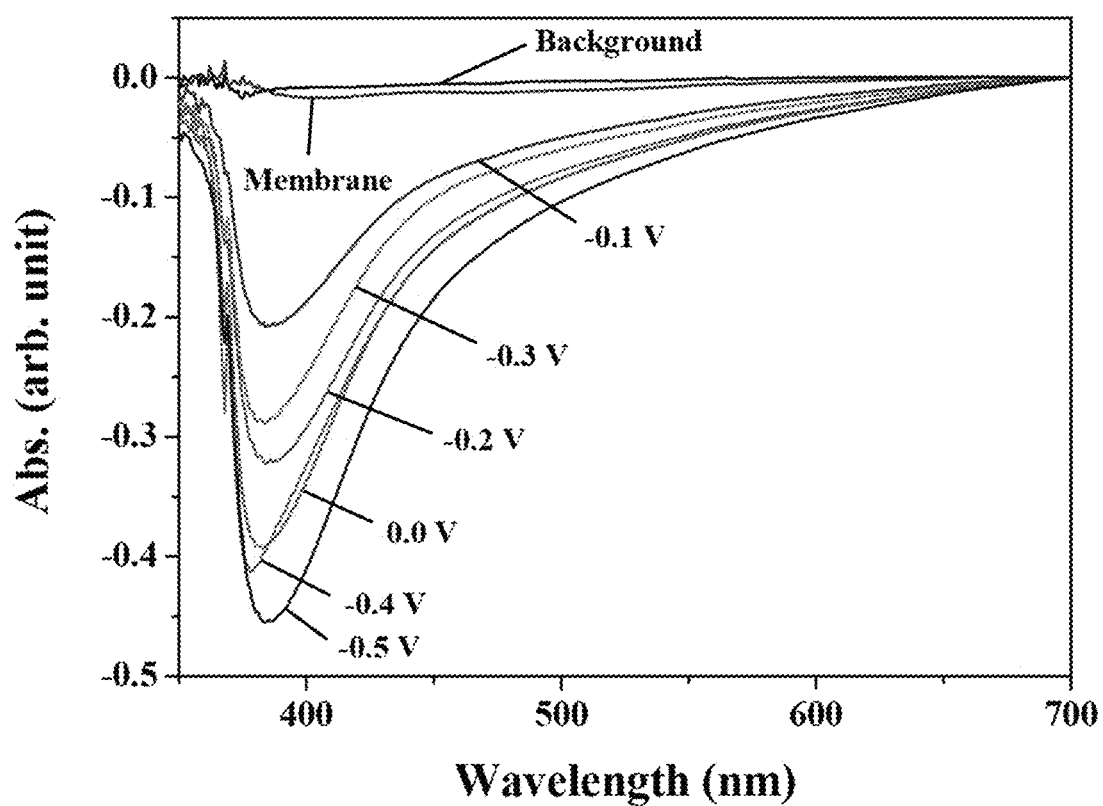
FIG. 5B is a graph of ultraviolet-visible spectrophotometry of ammonia produced at the electrode coated with the electrochemical catalyst according to Comparative Example 1 as analyzed by the Nessler's method.
Figure 5C:
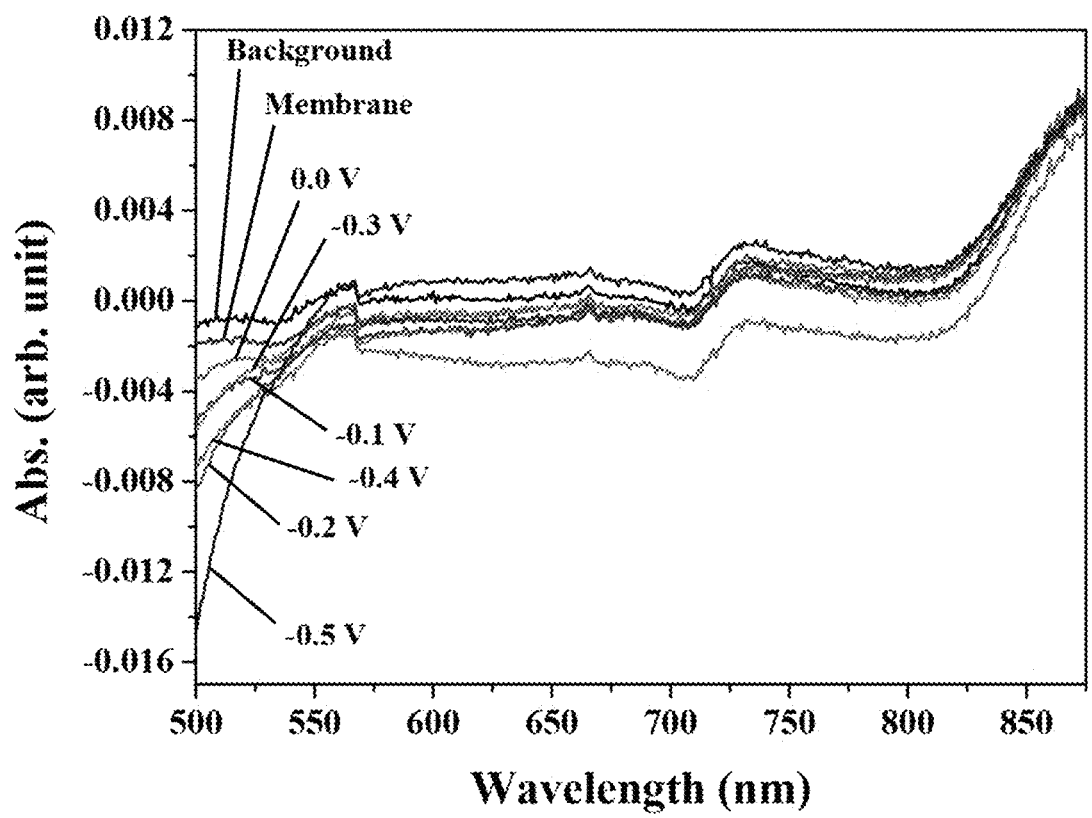
FIG. 5C is a graph of ultraviolet-visible spectrophotometry of ammonia produced at the electrode coated with the electrochemical catalyst according to Comparative Example 1 as analyzed by the indophenol method.

The electrode coated with the catalyst according to Comparative Example 1 was used to test electrochemical characteristics through chronoamperometry. In addition, the electrode coated with the catalyst according to Comparative Example 1 was used to carry out ammonia synthesis and UV-Vis spectrometry was carried out through the Nessler's method and indophenol method to determine ammonia production. The results of chronoamperometry are shown in FIG. 5A and the results of UV-Vis spectrometry using the Nessler's method and indophenol method are shown in FIG. 5B and FIG. 5C, respectively.

Figure 4:
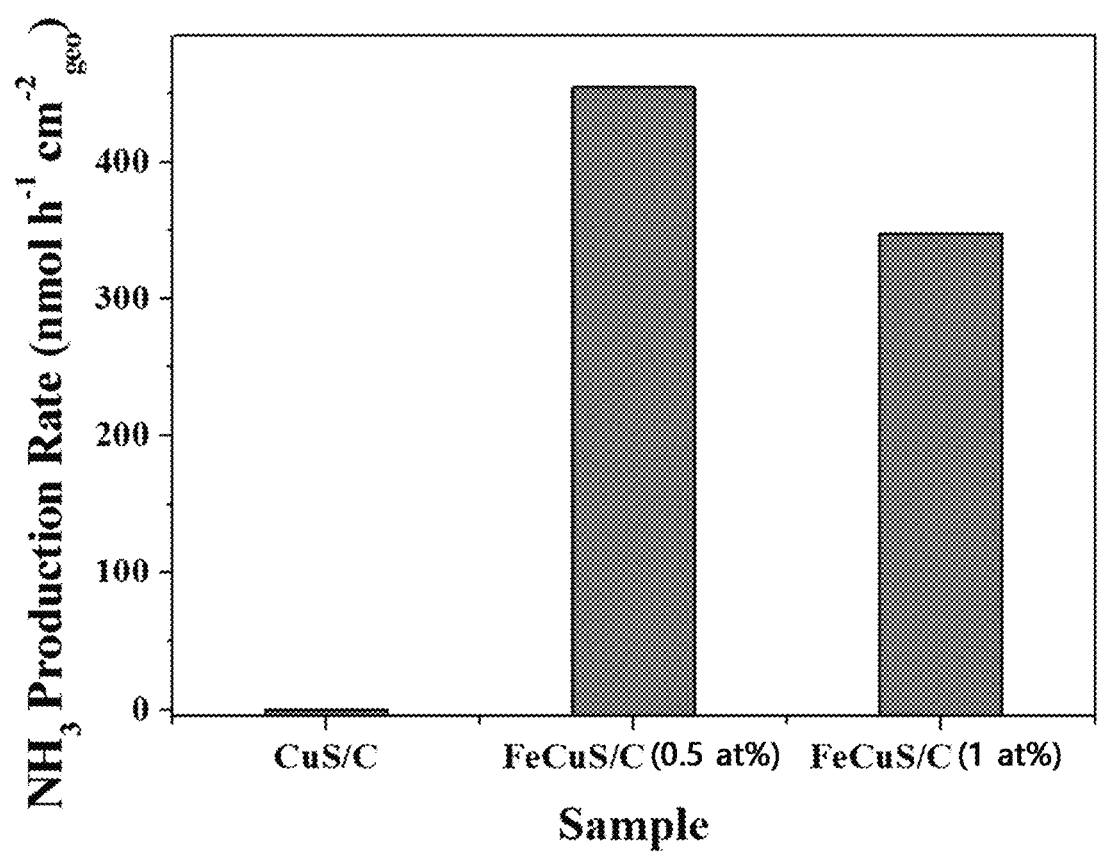
FIG. 4 is a graph illustrating the ammonia production rate when using each of the electrodes coated with the electrochemical catalysts according to Examples 1 and 2 and Comparative Example 1.

FIG. 4 is a graph illustrating the ammonia production rate when carrying out ammonia synthesis by using each of the electrodes coated with the catalysts according to Examples 1 and 2 and Comparative Example 1. It can be seen from the results that use of the catalyst free from Fe according to Comparative Example 1 cannot accomplish ammonia synthesis.

Test Example 4: Ammonia Synthesis Data Using C-Free Catalyst

Figure 7A:
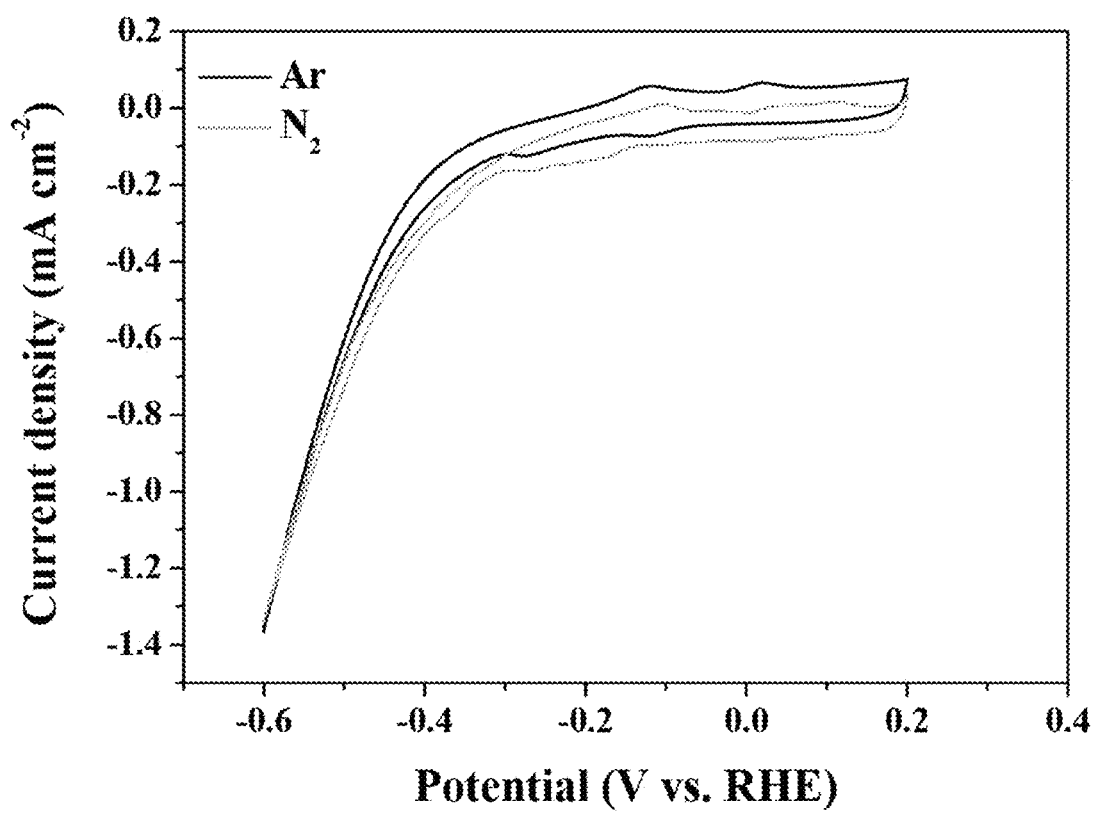
FIG. 7A is a graph of cyclic voltammetry (CV) of the electrode coated with the electrochemical catalyst according to Comparative Example 2.
Figure 7B:
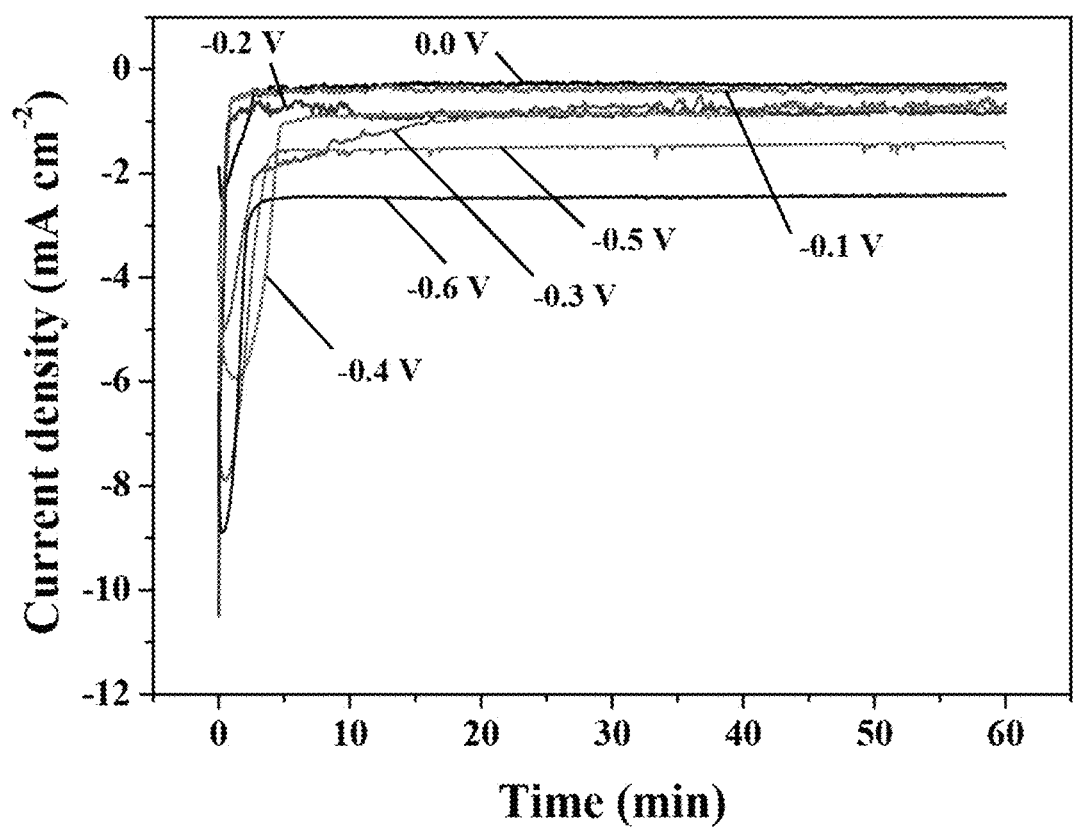
FIG. 7B is a graph of chronoamperometry (CA) of the electrode coated with the electrochemical catalyst according to Comparative Example 2.
Figure 7C:
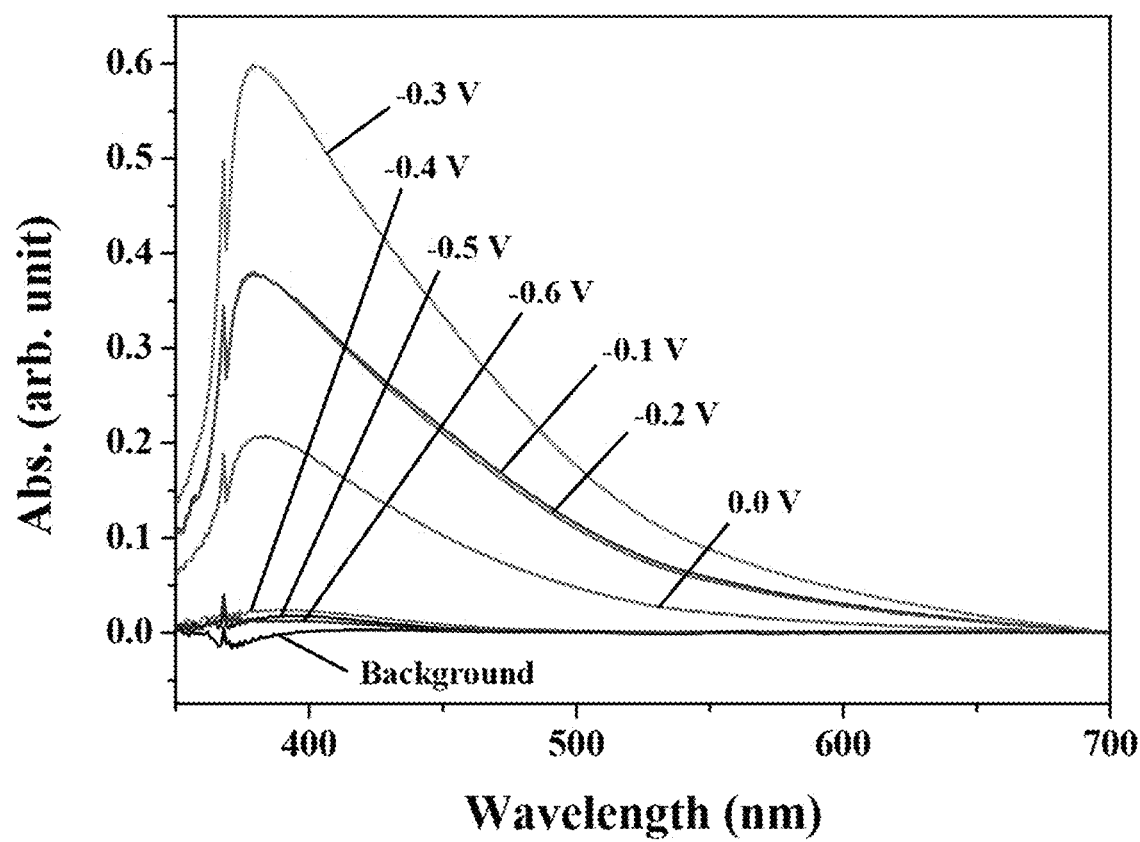
FIG. 7C is a graph of ultraviolet-visible spectrophotometry of ammonia produced at the electrode coated with the electrochemical catalyst according to Comparative Example 2 as analyzed by the Nessler's method.
Figure 7D:
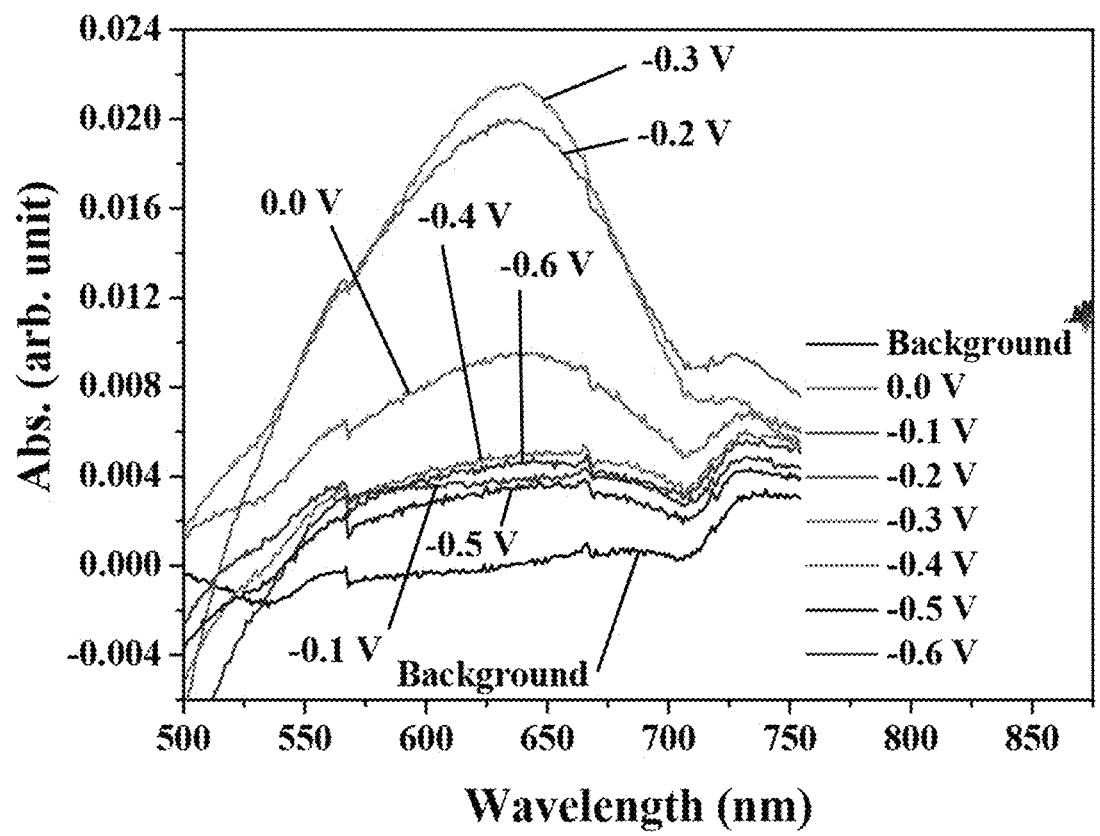
FIG. 7D is a graph of ultraviolet-visible spectrophotometry of ammonia produced at the electrode coated with the electrochemical catalyst according to Comparative Example 2 as analyzed by the indophenol method.

The electrode coated with the catalyst according to Comparative Example 2 was used to test electrochemical characteristics through cyclic voltammetry and chronoamperometry. In addition, the electrode coated with the catalyst according to Comparative Example 2 was used to carry out ammonia synthesis and UV-Vis spectrometry was carried out through the Nessler's method and indophenol method to determine ammonia production. The results of cyclic voltammetry are shown in FIG. 7A and the results of chronoamperometry are shown in FIG. 7B. The results of UV-Vis spectrometry using the Nessler's method and indophenol method are shown in FIG. 7C and FIG. 7D, respectively.

The following Table 3 shows the results of electrochemical ammonia synthesis activity using the electrode coated with the catalyst according to Comparative Example 2, as determined by the indophenol method.

TABLE 3

| Applied potential (V vs. RHE) | F.E (%) | $rNH_3$ (nmolh$^{-1}$cm$^{-2}_{geo}$) | current density (µA/cm$^2$) |
| --- | --- | --- | --- |
| 0.0 | 2.02 | 89.7 | 7.2 |
| −0.1 | 0.67 | 35.2 | 2.8 |
| −0.2 | 1.75 | 190.5 | 15.3 |
| −0.3 | 1.55 | 203.6 | 16.4 |
| −0.4 | 0.33 | 47.0 | 3.8 |
| −0.5 | 0.15 | 32.9 | 2.6 |
| −0.6 | 0.14 | 44.8 | 3.6 |

Figure 6:
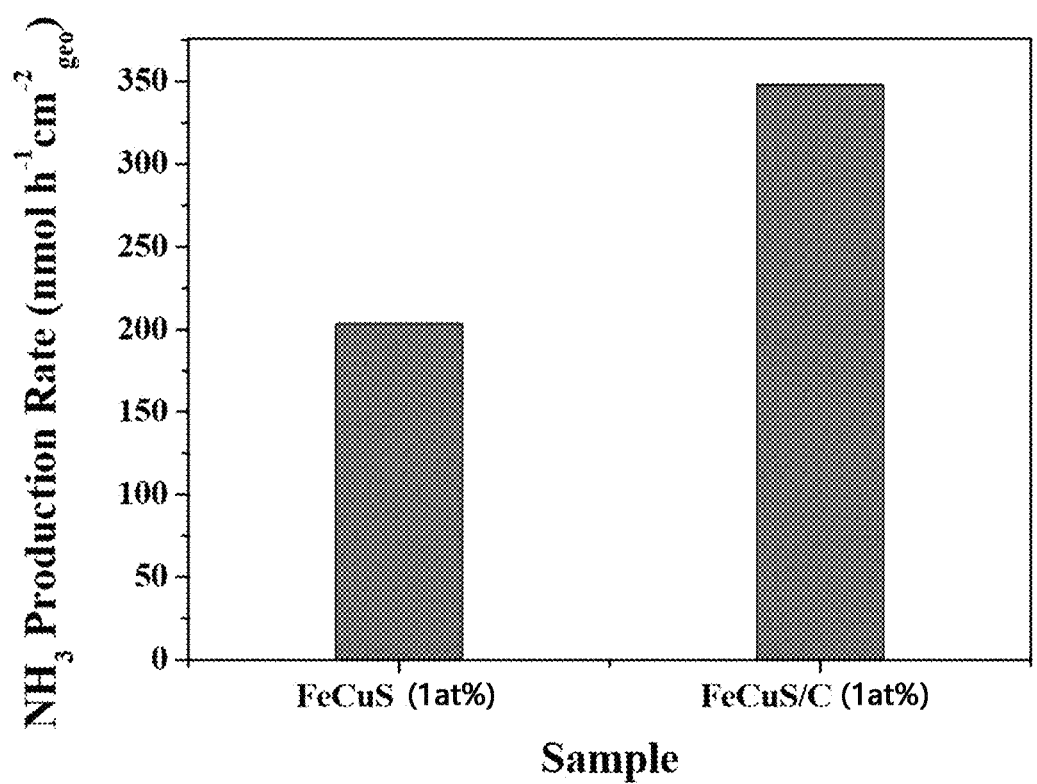
FIG. 6 is a graph illustrating the ammonia production rate when using each of the electrodes coated with the electrochemical catalysts according to Example 2 and Comparative Example 2.

FIG. 6 is a graph illustrating the ammonia production rate when carrying out ammonia synthesis by using each of the electrodes coated with the electrochemical catalysts according to Example 2 and Comparative Example 2. The electrode free from carbon as a catalytic carrier according to Comparative Example 2 shows a decrease in production rate to approximately a half of the production rate according to Example 2.

Figure 8A:
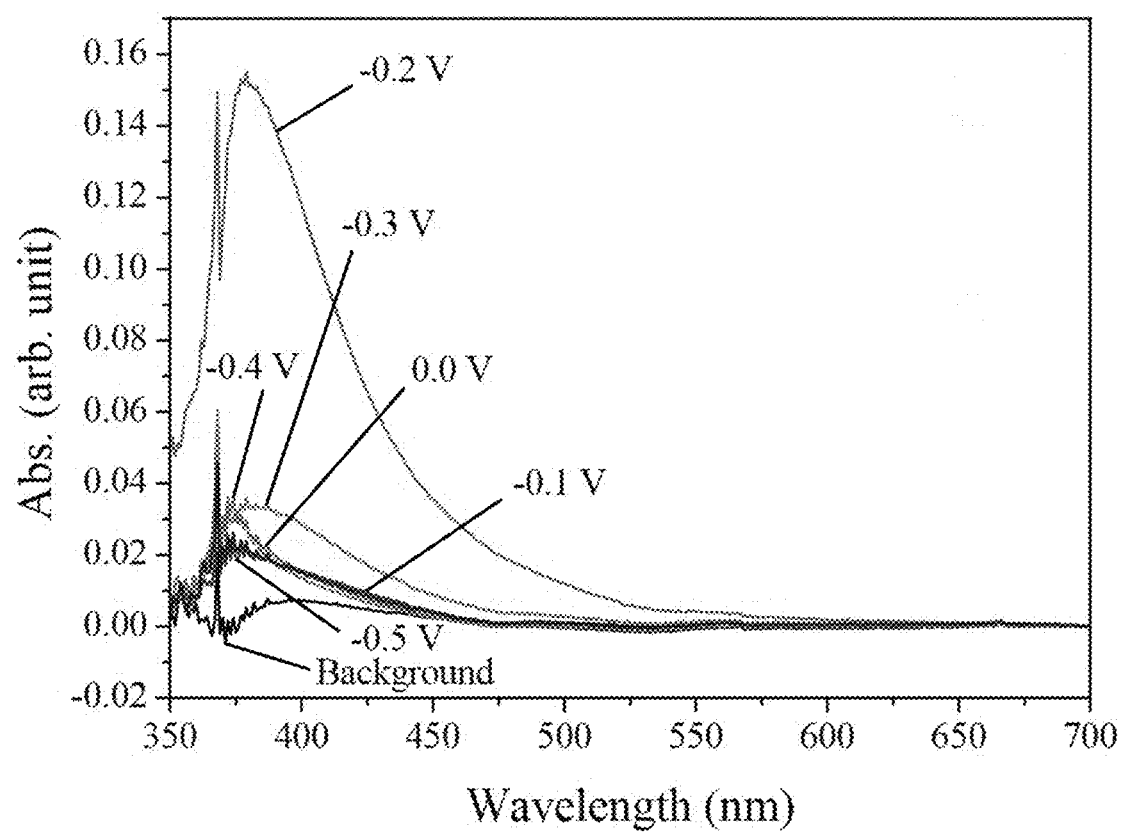
FIG. 8A is a graph of ultraviolet-visible spectrophotometry of ammonia produced at the electrode coated with the electrochemical catalyst according to Comparative Example 3 as analyzed by the Nessler's method.
Figure 8B:
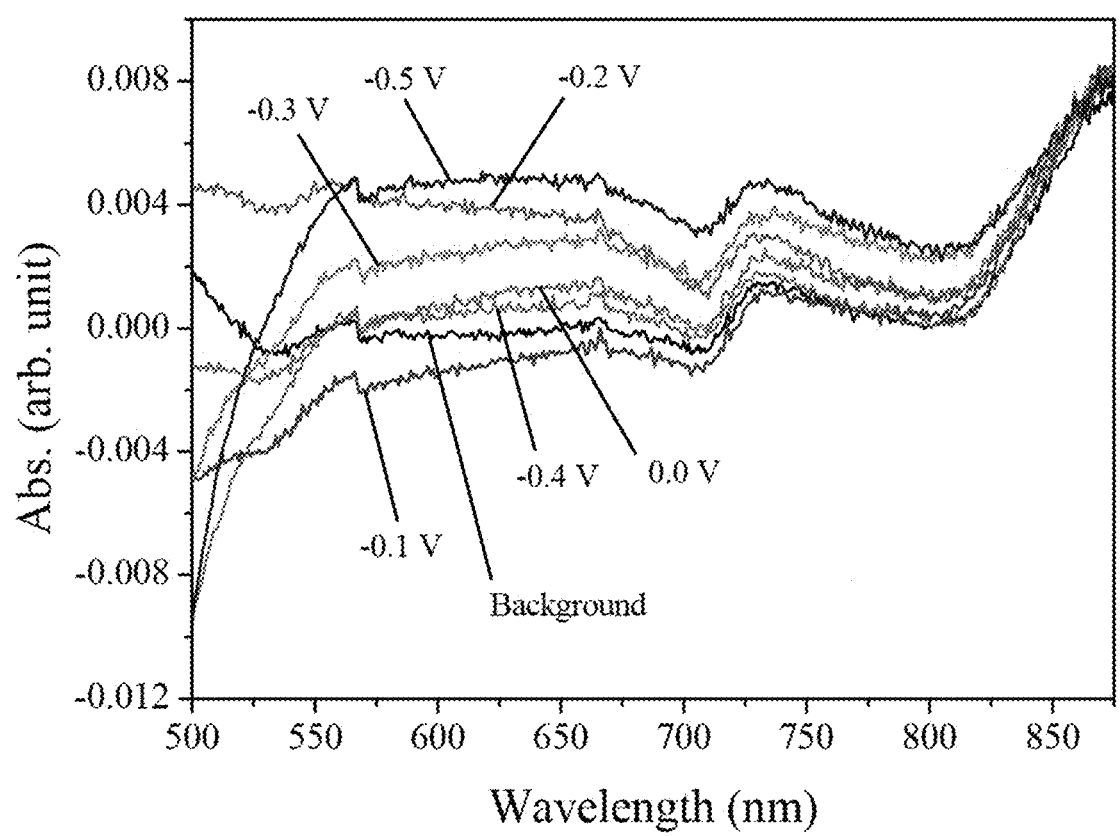
FIG. 8B is a graph of ultraviolet-visible spectrophotometry of ammonia produced at the electrode coated with the electrochemical catalyst according to Comparative Example 3 as analyzed by the indophenol method.

Test Example 5: Ammonia Synthesis Data Using Electrode Coated with Pd—Cu—S/C Catalyst The electrode coated with the catalyst according to Comparative Example 3 was used to carry out ammonia synthesis. In addition, UV-Vis spectrometry was carried out through the Nessler's method and indophenol method to determine ammonia production. The results of UV-Vis spectrometry using the Nessler's method and indophenol method are shown in FIG. 8A and FIG. 8B, respectively.

The following Table 4 shows the results of electrochemical ammonia synthesis activity using the electrode coated with the catalyst according to Comparative Example 3, as determined by the indophenol method.

TABLE 4

| Applied potential (V vs. RHE) | F.E (%) | $rNH_3$ (nmolh$^{-1}$cm$^{-2}_{geo}$) | current density (µA/cm$^2$) |
| --- | --- | --- | --- |
| 0.0 | 0.47 | 9.82 | 0.78 |
| −0.2 | 0.42 | 36.13 | 2.91 |
| −0.3 | 0.26 | 25.83 | 2.08 |
| −0.4 | 0.07 | 7.73 | 0.6 |
| −0.5 | 0.58 | 45.28 | 3.64 |

It can be seen from the results that Comparative Example 3 using Pd instead of Fe in the catalyst composition shows a rapid decrease in ammonia synthesis activity, unlike Examples 1 and 2.

Figure 9A:
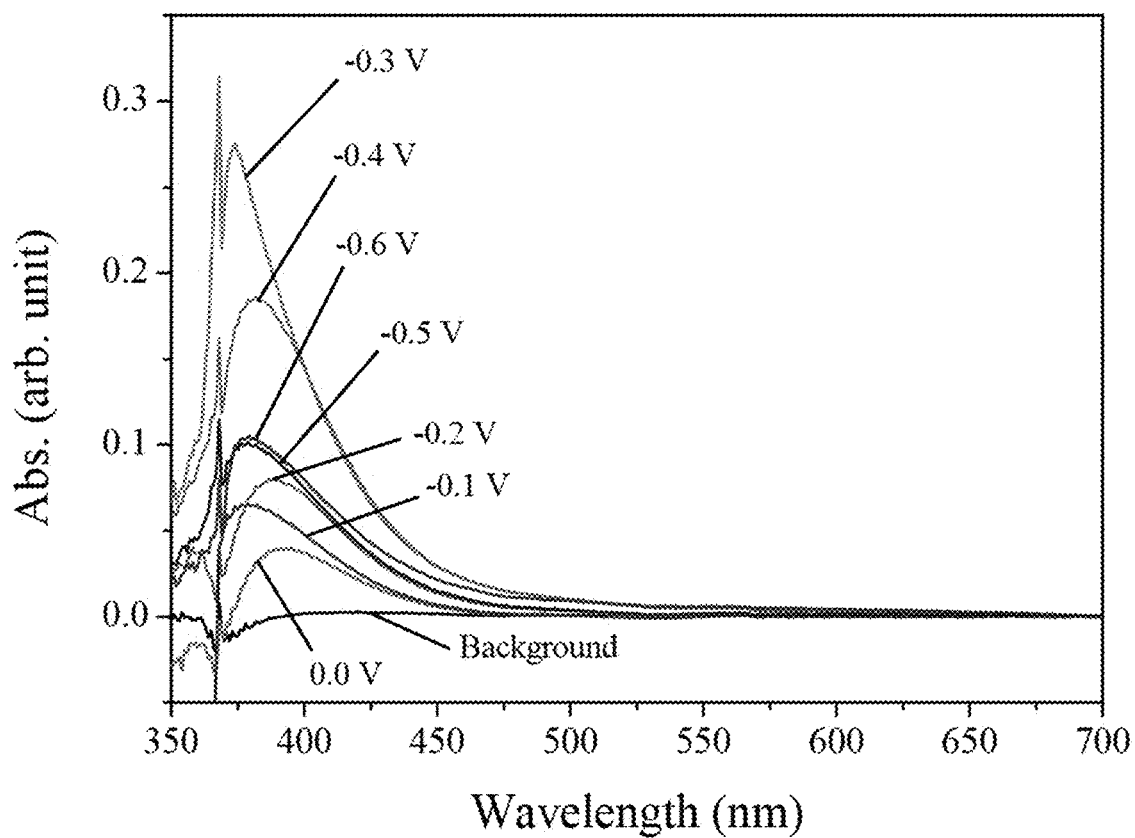
FIG. 9A is a graph of ultraviolet-visible spectrophotometry of ammonia produced at the electrode coated with the electrochemical catalyst according to Comparative Example 4 as analyzed by the Nessler's method.
Figure 9B:
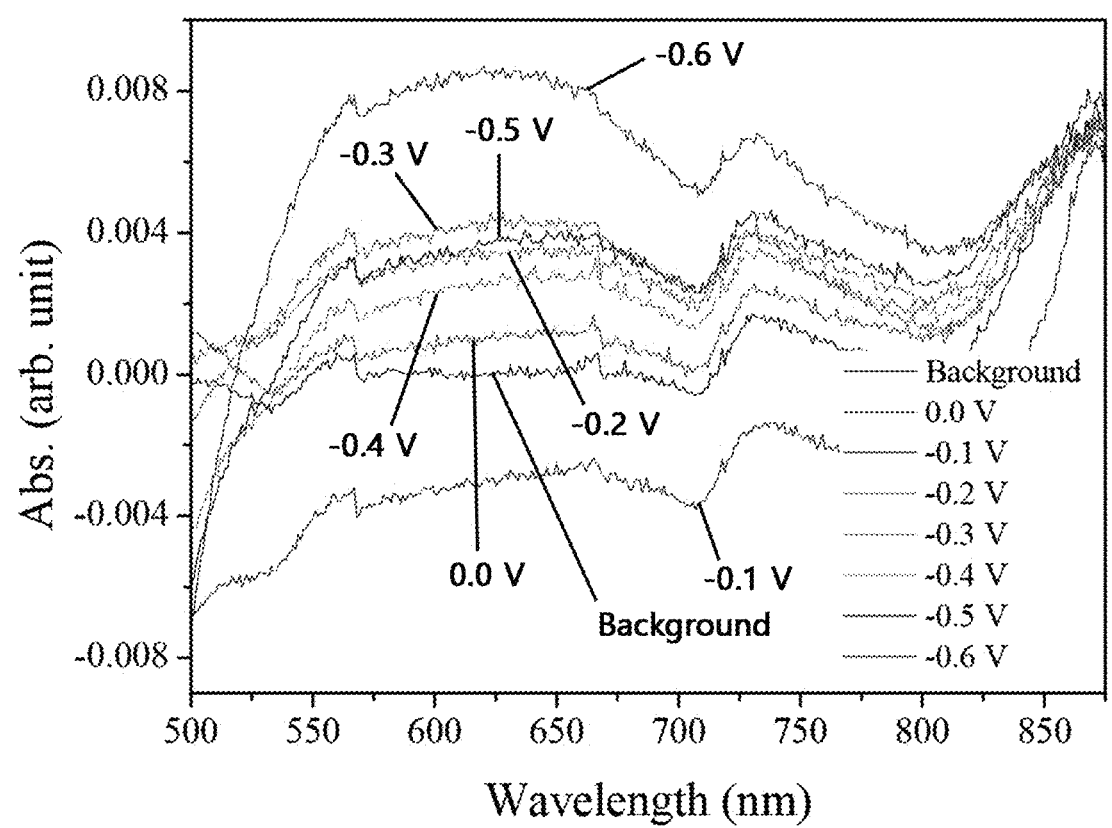
FIG. 9B is a graph of ultraviolet-visible spectrophotometry of ammonia produced at the electrode coated with the electrochemical catalyst according to Comparative Example 4 as analyzed by the indophenol method.

Test Example 6: Ammonia Synthesis Data Using Electrode Coated with Ru—Cu—S/C Catalyst The electrode coated with the catalyst according to Comparative Example 4 was used to carry out ammonia synthesis. In addition, UV-Vis spectrometry was carried out through the Nessler's method and indophenol method to determine ammonia production. The results of UV-Vis spectrometry using the Nessler's method and indophenol method are shown in FIG. 9A and FIG. 9B, respectively.

The following Table 5 shows the results of electrochemical ammonia synthesis activity using the electrode coated with the catalyst according to Comparative Example 4, as determined by the indophenol method.

TABLE 5

| Applied potential (V vs. RHE) | F.E (%) | $rNH_3$ (nmolh$^{-1}$cm$^{-2}_{geo}$) | current density (µA/cm$^2$) |
| --- | --- | --- | --- |
| 0.0 | 0.1 | 10.96 | 0.88 |
| −0.2 | 0.29 | 33.65 | 2.71 |
| −0.3 | 0.32 | 39.75 | 3.20 |
| −0.4 | 0.19 | 24.59 | 1.98 |
| −0.5 | 0.27 | 36.12 | 2.90 |
| −0.6 | 0.54 | 81.88 | 6.58 |

It can be seen from the results that Comparative Example 4 using Ru instead of Fe in the catalyst composition shows a rapid decrease in ammonia synthesis activity, unlike Examples 1 and 2.

Figure 10A:
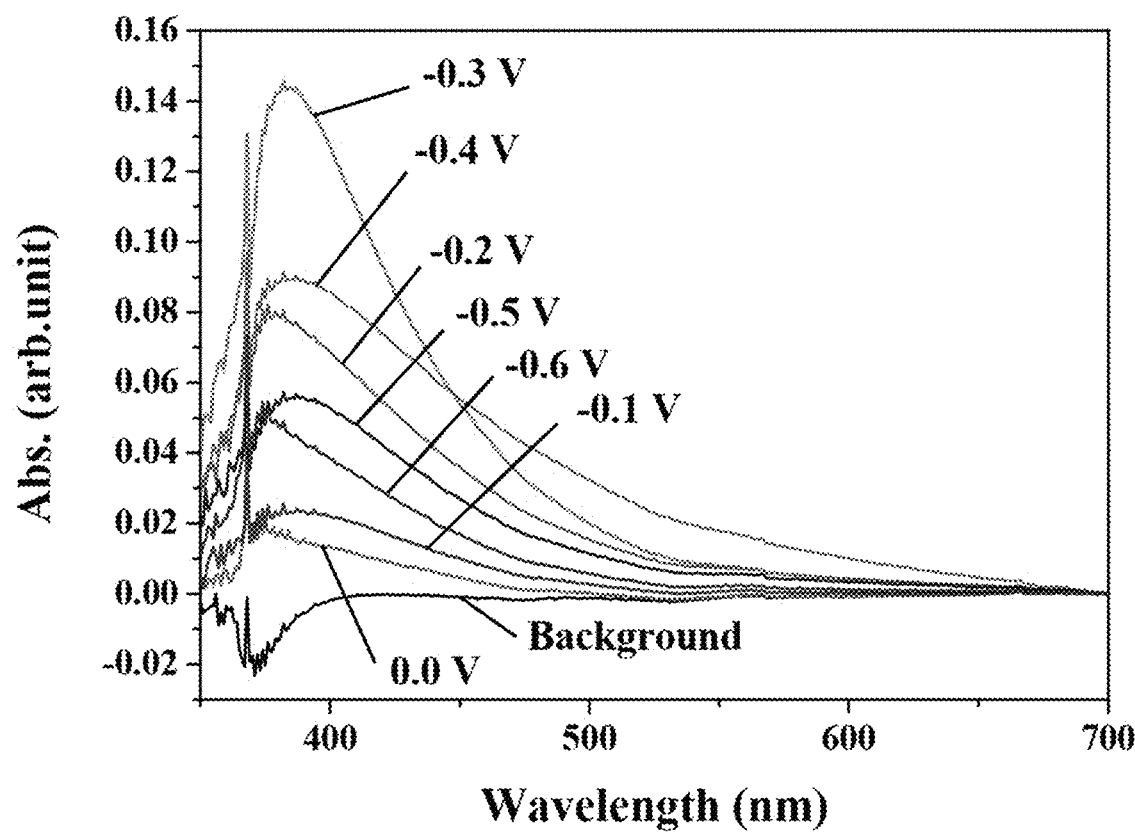
FIG. 10A is a graph of ultraviolet-visible spectrophotometry of ammonia produced at the electrode coated with the electrochemical catalyst according to Comparative Example 5 as analyzed by the Nessler's method.
Figure 10B:
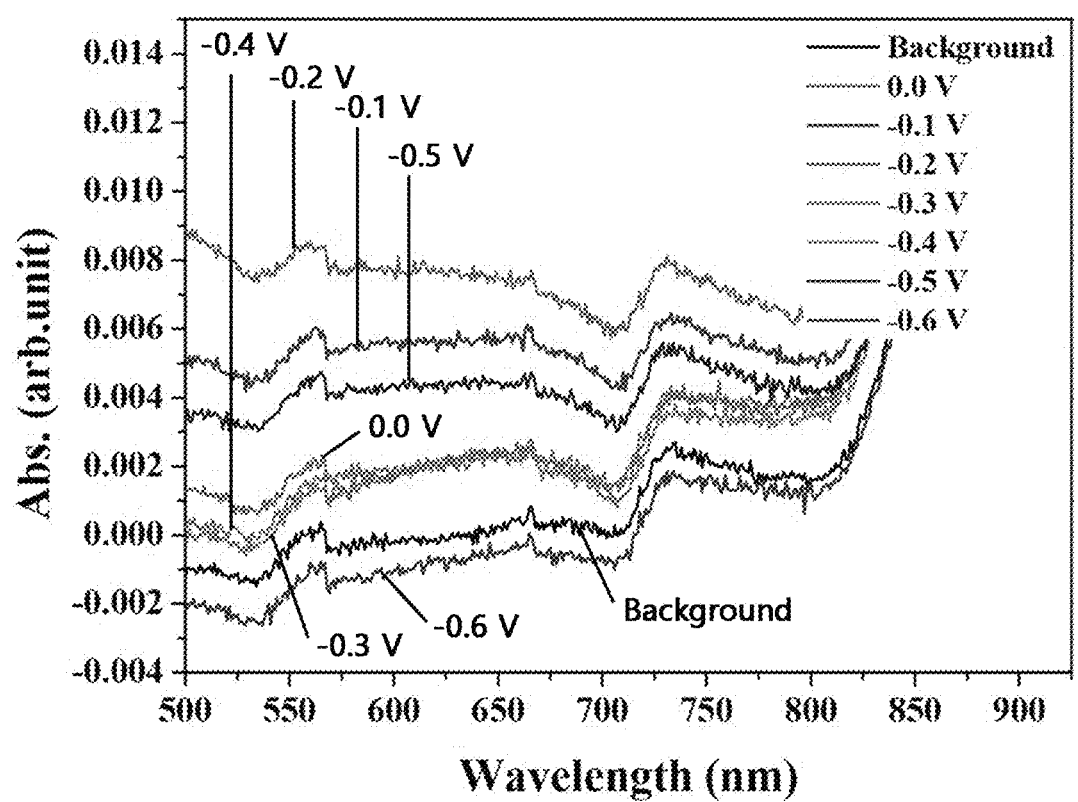
FIG. 10B is a graph of ultraviolet-visible spectrophotometry of ammonia produced at the electrode coated with the electrochemical catalyst according to Comparative Example 5 as analyzed by the indophenol method.

Test Example 7: Ammonia Synthesis Data Using Electrode Coated with Pt—Cu—S/C Catalyst The electrode coated with the catalyst according to Comparative Example 5 was used to carry out ammonia synthesis. In addition, UV-Vis spectrometry was carried out through the Nessler's method and indophenol method to determine ammonia production. The results of UV-Vis spectrometry using the Nessler's method and indophenol method are shown in FIG. 10A and FIG. 10B, respectively.

The following Table 6 shows the results of electrochemical ammonia synthesis activity of the electrode coated with the catalyst according to Comparative Example 5 as a function of applied potential.

TABLE 6

| Applied potential (V vs. RHE) | F.E (%) | $rNH_3$ (nmolh$^{-1}$cm$^{-2}_{geo}$) | current density (µA/cm$^2$) |
| --- | --- | --- | --- |
| 0.0 | 0.28 | 22 | 1.8 |
| −0.1 | 3.04 | 53.7 | 4.3 |

TABLE 6-continued

| Applied potential (V vs. RHE) | F.E (%) | rNH$_3$ (nmolh$^{-1}$cm$^{-2}_{geo}$) | current density (μA/cm$^2$) |
|---|---|---|---|
| −0.2 | 1.77 | 71.9 | 5.8 |
| −0.3 | 0.10 | 1.69 | 21 |
| −0.4 | 0.05 | 1.75 | 21.7 |
| −0.5 | 0.05 | 3.37 | 41.9 |

It can be seen from the results that Comparative Example 5 using Pt instead of Fe in the catalyst composition shows a rapid decrease in ammonia synthesis activity, unlike Examples 1 and 2.

What is claimed is:

1. A catalyst for electrochemical ammonia synthesis, comprising:
   a carbon carrier comprised of carbon; and
   20-65 wt% of iron, copper and sulfur, based on weight of the carbon, supported in the carbon carrier.

2. The catalyst for electrochemical ammonia synthesis according to claim 1, wherein the iron is present in an elemental amount of 0.1-10% based on total elemental content of iron, copper and sulfur.

3. The catalyst for electrochemical ammonia synthesis according to claim 1, wherein the copper and the sulfur are present in an elemental content ratio of copper to sulfur that is 1:2-2:1.

4. The catalyst for electrochemical ammonia synthesis according to claim 1, wherein the carbon carrier is selected from the group consisting of KETJENBLACK, carbon black, graphite, carbon nanotubes, carbon nanocages, carbon fibers, and combinations thereof.

5. The catalyst for electrochemical ammonia synthesis according to claim 1, which is coated on an electrode selected from the group consisting of carbon paper, carbon cloth, carbon felt, fluorine-doped tin oxide (FTO) conducting glass, and combinations thereof.

6. The catalyst for electrochemical ammonia synthesis according to claim 5, wherein the catalyst is coated by a method selected from the group consisting of spray coating, screen printing, and ink jet printing.

7. The catalyst for electrochemical ammonia synthesis according to claim 5, wherein the catalyst is spray coated with an areal density of 0.1-10 mg/cm$^2$.

8. An electrode for electrochemical ammonia synthesis, comprising the catalyst as defined in claim 1.

9. A catalyst for electrochemical ammonia synthesis, comprising:
   a carbon carrier comprised of carbon; and
   20-65 wt% of iron, copper and sulfur based on weight of the carbon, supported in the carbon carrier,
   wherein the iron is present in an elemental amount of 0.1-10% based on total elemental content of iron, copper and sulfur, and
   wherein the copper and the sulfur are present in an elemental content ratio of copper to sulfur that is 1:2-2:1.

10. The catalyst for electrochemical ammonia synthesis according to claim 9, wherein the carbon carrier is selected from the group consisting of KETJENBLACK, carbon black, graphite, carbon nanotubes, carbon nanocages, carbon fibers, and combinations thereof.

11. The catalyst for electrochemical ammonia synthesis according to claim 9, which is coated on an electrode selected from the group consisting of carbon paper, carbon cloth, carbon felt, fluorine-doped tin oxide (FTO) conducting glass, and combinations thereof.

12. The catalyst for electrochemical ammonia synthesis according to claim 11, wherein the catalyst is coated by a method selected from the group consisting of spray coating, screen printing and ink jet printing.

13. The catalyst for electrochemical ammonia synthesis according to claim 11, wherein the catalyst is spray coated with an areal density of 0.1-10 mg/cm$^2$.

14. An electrode for electrochemical ammonia synthesis, comprising the catalyst as defined in claim 9.

* * * * *